United States Patent [19]

Landry et al.

[11] Patent Number: 5,302,662
[45] Date of Patent: Apr. 12, 1994

[54] COMPATIBLE POLYAMIDE BLENDS

[75] Inventors: Christine J. Landry, Honeoye Falls; Dennis J. Massa, Pittsford; Timothy E. Long, Hilton; Michael R. Landry, Honeoye Falls; David M. Teegarden; Ralph H. Colby, both of Rochester, all of N.Y.

[73] Assignee: Eastman Kodak Company, Rochester, N.Y.

[21] Appl. No.: 19,718

[22] Filed: Feb. 19, 1993

[51] Int. Cl.$^5$ .................. C08L 77/00; C08L 69/00; C08L 71/12; C08L 25/04
[52] U.S. Cl. ........................ 525/66; 525/133; 525/146; 525/179; 525/184; 525/92
[58] Field of Search ............... 525/66, 133, 146, 179, 525/184, 92

[56] References Cited

U.S. PATENT DOCUMENTS

| | | | |
|---|---|---|---|
| 4,339,376 | 7/1982 | Kasahara | 525/133 |
| 4,782,117 | 11/1988 | Lausberg | 525/146 |
| 4,849,474 | 7/1989 | Gallucci | 525/179 |
| 4,866,126 | 9/1989 | Mylonakis et al. | 525/68 |
| 4,880,487 | 11/1989 | Sheehan | 525/184 |
| 4,885,334 | 12/1989 | Mayumi et al. | 525/66 |
| 5,250,624 | 10/1993 | Teegarden | 525/179 |

FOREIGN PATENT DOCUMENTS

| | | | |
|---|---|---|---|
| 0274140 | 7/1988 | European Pat. Off. | |
| 109455 | 5/1991 | Japan | 525/146 |

OTHER PUBLICATIONS

Norman G. Gaylord, Compatibilizing Agents: Structure and Function in Polyblends, 1989, J. Macromol. Sci. Chem. A26(8), pp. 1211-1229.

*Primary Examiner*—David Buttner
*Attorney, Agent, or Firm*—Judith A. Roesler; J. Jeffrey Hawley

[57] ABSTRACT

Novel blends have been discovered comprising: (A) a polyamide; (B) a polymer that is miscible with polystrene; and (C) a compatibilizer comprising a copolymer having repeating units derived from an aromatic vinyl compound monomer and repeating units derived from vinylphenol monomers, wherein at least about 50% of said aromatic vinyl compound monomers are styrene monomeric units. The blends show improvements in mechanical properties as compared to similar blends without the compatibilizer.

17 Claims, No Drawings

COMPATIBLE POLYAMIDE BLENDS

FIELD OF THE INVENTION

The present invention relates to blends of polymers that are compatible, useful for many applications including packaging applications owing to their chemical resistance and toughness.

BACKGROUND OF THE INVENTION

Polyamides, some of which are commonly referred to as nylons, are known polymers having amide groups in the polymer backbone. Polyamides have achieved great commercial success as used in synthetic fibers and engineering resins, and if not too crystalline, as plastics.

Although polyamides have many desirable characteristics, modification of the properties of the polymer would be useful. Polymer blends offer a route to novel and useful materials having improved properties, such as easier processing, better mechanical properties, chemical or environmental resistance and lower cost, and so on. When two polymers are blended, however, owing to their usual incompatibility, their blend physical properties may be much poorer than those of the individual components. It is desirable and often necessary to add a third constituent, called a compatibilizer, which functions to restore or improve the blend properties. The term compatibilizer is defined to encompass any material that is used to bring together two otherwise incompatible polymers in a blend with improved properties. Compatibilizers can be reactive or non-reactive. There is a continuing need to discover methods to increase the versatility of polyamides. It would be highly desirable to discover polymers and compatibilizers useful for blending polymers with polyamides.

SUMMARY OF THE INVENTION

In accordance with the present invention, there is provided a novel blend comprising: (A) a polyamide; (B) a polymer that is miscible with polystyrene; and (C) a compatibilizer comprising a copolymer having repeating units derived from an aromatic vinyl compound monomer and repeating units derived from vinylphenol monomers, wherein at least about 50% of said aromatic vinyl compound monomers are styrene monomeric units.

It has been discovered that the above-mentioned compatibilizers unexpectedly provide improvements to blends of polyamides and polymers that are miscible with polystyrene. With the addition of the compatibilizer to the blends, improvements in the stress and strain at break, the tensile modulus, the yield stress, and the work to break were observed relative to the uncompatibilized blends [i.e. blends of polyamides and polymers miscible with polystyrene without the compatibilizer (C)].

The novel blend is useful for both molded and film applications. The blend is particularly useful for engineering applications. Other uses will be apparent to those skilled in the art.

DETAILED DESCRIPTION

Suitable polyamides employed in the novel miscible blend are either amorphous (and do not have a melting point) or crystalline. The distinction between polyamides that are amorphous and polyamides that are crystalline is well known. According to the invention, the polyamides may be directly blended with the compatibilizer and the polymer that is miscible with polystyrene. As shown in the examples, the inventive blends often show enhanced mechanical properties when the polyamides, particularly crystalline polyamides, are combined with a toughening agent prior to the blending components (A), (B), and (C).

When employed, toughening agents for polyamides are widely available commercially and are available as separate agents, such as, for example, KRATONG TM thermoplastic elastomers (TPE) and KRATON FX 1901X functionalyzed TPE (Shell Chemical Co.); PARALOID TM core-shell impact modifiers (Rohm and Haas); Methacrylate butadiene styrene (METABLEN TM from M and T Chemicals); various rubbers and elastomers such as poly(1,4-butadiene); acrylonitrile-butadiene-styrene (ABS) resins [Scientific Polymer Products (SP²)]; and SURLYN TM (E. I. DuPont de Nemours & Co.). Alternatively the toughening agents may be already incorporated into the polyamide as available commercially (such as, for example, ZYTEL TM and ZYTEL-ST TM which are commercially toughened nylon-6 resins available from E. I. DuPont de Nemours & Co).

Mixtures of different polyamides may also be employed in the invention, with the ratio of polyamides in the polyamide mixture formulated as desired.

As known to those skilled in the art, polyamides may be formed by condensation polymerization as well as addition polymerization, as discussed in *Encyclopedia of Polymer Science and Engineering*, 2nd Edition, 1985, Wiley, Vol. 11, pages 318-360. Preferred polyamides include the following list of polyamides:

| PREFERRED POLYAMIDES | | | |
|---|---|---|---|
| POLY-AMIDE | STRUCTURE | $T_g$ (°C.) | $T_m$ (°C.) |
| nylon 4 | $[-(CH_2)_3NHCO-]_n$ | 59 | 267 |
| nylon 4, 6 | $[-(CH_2)_4NHCO(CH_2)_4CONH-]_n$ | 58 | 291 |
| nylon 6 | $[-(CH_2)_5NHCO-]_n$ | 40 | 223 |
| nylon 6, 6 | $[-(CH_2)_4NHCO(CH_2)_6CONH-]_n$ | 45 | 262 |
| nylon 6, 9 | $[-(CH_2)_6NHCO(CH_2)_7CONH-]_n$ | 28 | 210 |
| nylon 6, 10 | $[-(CH_2)_6NHCO(CH_2)_8CONH-]_n$ | 25 | 222 |
| nylon 6, 12 | $[-(CH_2)_6NHCO(CH_2)_{10}CONH-]_n$ | 40 | 219 |
| nylon 11 | $[-(CH_2)_{10}CONH-]_n$ | 29 | 189 |
| nylon 12 | $[-(CH_2)_{11}CONH-]_n$ | 35 | 180 |
| nylon 3Me6T | $[-NHCO(C_6H_4)CONHCH_2C(CH_3)_2-CH_2CH(CH_3)CH_2CH_2-]_n$ | 149 | — |
| nylon MXD6 | $[-NHCH_2(C_6H_4)CH_2NHCO(CH_2)_4CO-]_n$ | 84 | 231 |

More preferably, the polyamide employed is nylon 6, nylon 6,6, nylon 11, nylon 3Me6T, nylon MXD6, and toughened nylons such as ZYTEL and ZYTEL ST, and mixtures thereof. Most preferably employed are MXD6, ZYTEL, and ZYTEL-ST.

The second component [component "(B)"] of the blend of the invention is a polymer that is miscible with polystyrene. Included in the definition of component (B) are poly(phenylene oxide), polystyrene, high-impact polystyrene, tetramethylbisphenol-A polycarbonate, poly(vinyl methyl ether), and mixtures of these polymers with polystyrene. Further these polymers may be mixed with styrene-containing copolymers and used as component (B). In the present invention, as recognized by those skilled in the art, by miscible it is meant that the polymers miscible with polystyrene form a homogeneous blend that has a single glass transition temperature ($T_g$) rather than separate glass transition temperatures for each polymer. Immiscible blends are those that have more than one glass transition temperature or show two distinct solid state NMR relaxation times.

Examples of polyphenylene oxide monomers that are miscible with polystyrene may be obtained by the polycondensation of one or a mixture of phenols represented by structure I, as follows:

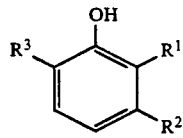

wherein $R^1$ represents a lower alkyl group having from 1 to about 3 carbon atoms and $R^2$ and $R^3$ each independently represent a hydrogen atom or a lower alkyl group having from 1 to about 3 carbon atoms, wherein at least about 50% of structure I is defined wherein $R^1$ and $R^3$ of structure I are methyl groups and $R^2$ is hydrogen [i.e. poly(2,6-dimethyl-1,4-phenylene oxide)]. More preferably, about 90% of structure I is defined as poly(2,6-dimethyl-1,4-phenylene oxide). Examples of polymers miscible with polystyrene are described, for example, in U.S. Pat. No. 4,885,334 at col. 1 –col. 2 where polyphenylene oxide containing polymers are discussed.

More preferably employed as the component (B) is polystyrene, poly(phenylene oxide), and mixtures thereof. When mixtures of polystyrene and poly(phenylene oxide) are employed, they may be prepared in any ratio. Most preferably employed as component (B) is poly(2,6-dimethyl-1,4-phenylene oxide).

The blend of the invention further comprises a compatibilizer [Component "(C)"]. The compatibilizer is a copolymer having repeating units derived from an aromatic vinyl compound monomers and repeating units of vinylphenol monomers.

The vinylphenol portion of the copolymer used as the compatibilizer may be derived from monomeric units having protecting groups on the vinylphenol, such as, for example, those defined by structure II hereinafter.

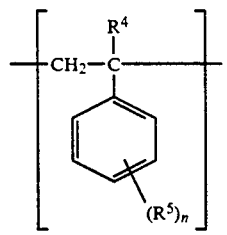

wherein,
$R^4$ is hydrogen or methyl;
n is an integer from 1 to 5; and
$R^5$ may be the same or different and represents —OH, —OSi($R^6$)$_3$, —OR$^6$, —OCOR$^6$, —OM, or tert-butyloxycarbonyloxy;
wherein
$R^6$ represents a straight or branched $C_1$ to $C_5$ alkyl group (such as, for example, methyl, ethyl, propyl, isopropyl, n-butyl, t-butyl, or pentyl), a $C_6$ to $C_{18}$ aryl group (such as, for example, benzyl, phenyl, toluyl and biphenyl), or an alkyl ether group of 2 to 5 carbon atoms (such as, for example, methoxymethyl, ethoxymethyl, and methoxyethyl); and M represents metal cation (including, for example, univalent or divalent alkali metal cations and alkaline earth or transition metal cations including sodium, magnesium, calcium, lithium, potassium or zinc cations).

In addition to the substituent on the pendant benzene ring as represented by $R^5$, the pendant benzene ring can be substituted in up to two of the remaining positions with non-interfering substituents selected from straight or branched $C_1$ to $C_4$ alkyl groups (such as, for example, methyl, ethyl, propyl, isopropyl or butyl), halo atoms (such as, for example, fluoro, chloro, bromo or iodo), straight or branched $C_1$ to $C_4$ haloalkyl groups (such as, for example, $CF_3$, $CH_2Br$, $CF_2CF_3$), or carboxy groups.

It is preferred that the monomeric units defined by structure II are substantially converted to vinylphenol (where $R^4$ is hydrogen, n is 1, and $R^5$ is an —OH group, most preferably in a para position) in amounts of at least about 10% based on the total monomeric units defined by structure II prior to the practice of this invention. More preferably at least 50% of the monomers defined by structure II are converted to vinylphenol. Most preferably the repeating units defined by structure II are substantially all converted to vinylphenol prior to use in the compatibilizer copolymer. As known to those skilled in the art, when $R^5$ is defined by a substituent other than an —OH, the conversion of the substituent to an —OH group can be accomplished by various methods known to those skilled in the art, such as, for example, by catalytic removal of dimethyl-t-butylsilyl or t-butyloxycarbonyloxy ("TBOC") (as further illustrated in Example I), or by heat treatment at temperatures of greater than about 150° C. of t-butyloxycarbonyloxystyrene containing polymer prior to or during the melt blending process.

The vinyl aromatic compound monomer portion of the copolymer compatibilizer [component "(C)"] may be derived from monomers defined by structure III, as follows:

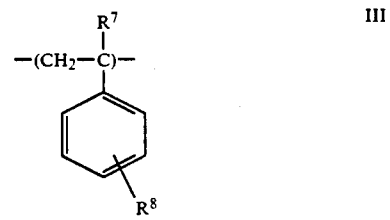

wherein $R^7$ and $R^8$ are independently selected from the group consisting of a hydrogen atom, a lower alkyl group having from 1 to about 6 carbon atoms, a chlorine atom and a bromine atom. Preferably, at least about 50% of the vinyl aromatic compound monomer is styrene wherein $R^7$ and $R^8$ are both hydrogen as defined by structure III.

Useful vinyl aromatic monomers as defined by structure III include styrene, p-methylstyrene, α-methylstyrene, t-butylstyrene and copolymers. More preferably, at least 90% of the units defined by structure III are styrene. Most preferably the vinyl aromatic compound monomers defined by structure III are substantially styrene.

As employed in this invention, component (C) is a copolymer of the previously defined vinyl aromatic compound monomers and vinylphenol monomers. Preferably, component (C) is selected from the group consisting of poly(styrene-b-vinylphenol) block copolymers; poly(styrene-g-vinylphenol) graft copolymers; poly(vinylphenol-g-styrene) graft copolymers; poly(styrene-co-vinylphenol) random copolymers, and mixtures thereof. Most preferably employed is poly(vinylphenol-g-styrene) graft copolymers and poly(styrene-b-vinylphenol) block copolymers. The preferred range for the molecular weight of component (C) is between about 1,500 and about 500,000. Particularly preferred compatibilizers have a molecular weight between about 20,000 and about 250,000. The compatibilizer copolymers may be prepared to have a monomer content of from about 80 parts vinyl aromatic compound monomers:20 parts of vinylphenol monomers to about 20 parts vinyl aromatic compound monomers:80 parts vinylphenol monomers, based on 100 parts of the vinyl aromatic compound monomers and vinylphenol monomers. Most preferably the copolymer composition is approximately about a 50/50 ratio of styrene and vinylphenol, based on 100 parts of copolymerized styrene and vinylphenol monomers.

The compatibilizer copolymer may be prepared by numerous methods known to those skilled in the art. For example, the styrene-vinylphenol block copolymer compatibilizers can be prepared by the method of Nakahama disclosed in *Yuki Gosei Kagaku* Vol. 47, pp. 448-456 (1989); *American Chemical Society Polymer Preprints*, Vol. 27, No. 1, pp. 194-5 (1986); and Japanese Kokai 59-53509 (1984). Graft copolymer compatibilizers can be prepared by conventional free radical copolymerization of a methacrylate-terminated polystyrene macromonomer and a suitably protected vinylphenol monomer or alternatively, of a methacrylate-terminated protected vinylphenol macromonomer and a styrenic monomer. Poly(vinylphenol) homopolymer (structure II) and random copolymers of monomers represented by structures II and III may also be prepared by conventional free radical polymerization.

Other additional components which may be included in the blend prior to or during the blending of components and include plasticizers (such as tricresyl phosphate and dioctyl phthalate), stabilizers (such as IRGANOX ™, supplied by Ciba-Geigy, Hawthorne, N.Y.), dyes, flame retardants, fillers (such as, talc, chopped fibers), and so on, and mixtures thereof.

The compatible blends of this invention are readily prepared by mixing about 1 to 98 parts by weight of component (A) with about 98 to 1 parts by weight of component (B), and from about 1 to 10 parts (more preferably 2 to 7 parts, and most preferably about 5parts) by weight of the compatibilizer based on the 100 parts of the combined components (A), (B), and (C). More particularly, the compatibilizer is generally employed in a varying amount, depending upon the desired properties of the blend, so long as the compatibilizer is present in an amount sufficient to effect compatibility between the components (A) and (B). As used herein, the term compatible is intended to describe components mixing and being processable without difficulty, and resulting in blends having good material properties.

Any number of methods which are known in the art may be employed in blending the components. For example, the components can be mixed in their powder form and then melt blended by melt mixing and extruding the mixture, for example, in a screw extruder. In another method, the polymer components can be solution blended by dissolving the components in a solvent common for all polymers and then precipitating the blend in a non-solvent for all of the polymers. The various polymers included in this invention may have different solubility characteristics, thus the selection of the solvent must be appropriately selected, as easily determined by one skilled in the art. Examples of solvents which may be employed include, but are not limited to, dimethyl formamide (DMF), m-cresol, formic acid, pyridine, tetrahydrofuran, and so on. Additionally, mixtures of solvents may also be employed. Examples of non-solvents include, but are not limited to, hexane, ligroine, heptane, water, and so on. Alternatively, rather than precipitating the blend in a non-solvent, the blend prepared by the solution blending process can be solvent cast or coated onto an inert substrate or cast into a mold.

Optionally, the blends may be cured by crosslinking the phenol or the amide units by including any curing agent as known in the art (such as, diisocyanate or diepoxides). Further, under certain conditions (such as exposure to high temperatures during melt processing) a small amount of the phenol may react with the polyamide in an interchange reaction.

The novel blend is useful for both molded and film applications.

Blends prepared in accordance with the invention may be clear or opaque, depending upon the starting materials employed and the amount of crystallinity. Those having good clarity are useful for packaging of protective coatings. Those which are opaque are useful for molded parts or structural applications.

EXAMPLES

The following examples are intended to illustrate more fully the nature of the invention without acting as a limitation upon its scope. Other compositions can readily be prepared in light of this disclosure and guiding principles and teachings provided herein.

The mechanical properties of the inventive blends prepared were determined using the ASTM D638MIII Tensile Test (Small Dogbone), on a Sintech Model 20 mechanical testing apparatus. The results are listed in Tables I, II and III. The yield stress $\sigma_y$, stress at break $\sigma_b$, elongation to break $\xi_b$, and work to break $w_b$ all improve (significantly increase) with added compatibilizer. The modulus was also found to be slightly higher with added compatibilizer.

Additional evidence for the efficacy of the added compatibilizer was found by examining the fracture surfaces of the specimens after testing using scanning electron microscopy. The blend without added compatibilizer has poor adhesion between the phases, while the blend with added compatibilizer has a rough surface characteristic of ductile fracture and shows no evidence of interfacial failure between phases. Blends, with and without added compatibilizer, are phase separated and show two glass transition temperatures by differential scanning calorimetry.

EXAMPLE I

The crystalline polyamide nylon 6 was blended with poly(phenylene oxide) ["PPO"] and poly(vinylphenolog-styrene) [hereinafter ("Poly(VPh-g-S)"], with results shown in TABLE I.

Nylon-6 (polycaprolactam) "Nylon 6" was obtained from Scientific Polymer Products Inc. (SP$^2$) in pellet form. The pellets were ground in a grinder in the presence of liquid nitrogen. Poly(2,6-dimethyl-1,4-phenylene oxide) ("PPO") was obtained in powder form from General Electric Corp.

The poly(vinylphenol-g-styrene) ["Poly(VPh-g-S)"] was prepared by copolymerization followed by copolymer deprotection, in the following manner. The graft copolymerization was conducted by combining a polystyrene macromonomer having a molecular weight=13,000) with a comonomer t-butyloxycarbonyloxy ("TBOC"), and an initiator (2,2'-Azobisisobutyronitrile)("AIBN"). These items were placed in a clean one necked flask. A septum was attached and the vessel purged with nitrogen. Freshly distilled solvent was then added via cannula and the contents were swirled to effect dissolution. The solution was deoxygenated by sparging with nitrogen for 15 minutes, and then the vessel was immersed in a constant temperature water bath at 60° C. for 48 hours. At the end of this time, the viscous solution was diluted, precipitated into methanol, and the polymer dried in a vacuum oven overnight at 60° C. Thereafter, the graft copolymer thus formed was deprotected by dissolving 5 grams of the copolymer with magnetic stirring in 75 mL of dioxane under a blanket of nitrogen in a 250 mL three-neck round bottomed flask fitted with a condenser, nitrogen inlet, and thermometer. After deoxygenating the solution for 15 minutes with nitrogen, 5 mL trifluoroacetic acid (Eastman Kodak) was added dropwise over several minutes. The mixture was refluxed for 24 hours. Upon cooling, the polymer was isolated by precipitation into water, recipitated into 35:65 v/v cyclohexane/hexane to remove unreacted polystyrene macromonomer, then dried overnight in a vacuum oven at 80° C. Yields were greater than 95% and proton NMR confirmed the absence of the TBOC protecting group. The copolymer composition as determined by proton NMR was approximately about a 50/50 mole ratio of vinylphenol to sytrene units. The peak molecular weight of the copolymer was approximately 100,000, as determined by size exclusion chromatography.

The dry blend of components (A), (B), and (C) was prepared by first grinding the nylon 6 pellets in a grinder in the presence of liquid nitrogen. A dry blend was prepared by mixing 9.5 g of Nylon-6 [Component (A)] with 9.6 g of PPO [Component (B)] and 1.0 g of Poly(VPh-g-S) [Component (C)] in their powdered form in a bottle. The powders were then dried overnight at ca. 110° C. under vacuum and melt mixed and extruded at a temperature of 277° C. using a laboratory extruder equipped with a ¼-in screw and a 2" slit die. Continuous films approximately 2" wide and ca. 0.6 mm thick were obtained. The same procedure was followed to prepare a 1/1 by weight melt-extruded blend of nylon-6 with PPO without added Poly(VPh-g-S). Results are shown in TABLE I.

Compositions of the same type described above were also prepared in the manner previously described, only substituting Nylon 11 (also obtained from SP²) for Nylon 6. Results are also shown in TABLE I hereinafter.

TABLE I

| Blend Composition | Stress at break $\sigma_b$, MPa | Strain at break $\epsilon_b$, % | Yield Stress, $\sigma_y$, MPa | Tensile Modulus, MPa | Work to break, MPa |
|---|---|---|---|---|---|
| Nylon-6/PPO 75/25 | 10 | 7 | 11 | 420 | 0.6 |
| Nylon-6/PPO/ Poly(VPh-g-S) 71.25/23.75/5.0 | 11 | 7 | 13 | 490 | 0.6 |
| Nylon-6/PPO 50/50 | 18 | 3 | none | 840 | 0.3 |
| Nylon-6/PPO/ Poly(VPh-g-S) 47.5/47.5/5.0 | 23 | 3 | none | 930 | 0.3 |
| Nylon-6/PPO 25/75 | 33 | 5 | 36 | 1170 | 1.1 |
| Nylon-6/PPO/ Poly(VPh-g-S) 23.75/71.25/5.0 | 33 | 4 | none | 1180 | 0.7 |
| Nylon-11/PPO 50/50 | 22 | 4 | none | 790 | 0.5 |
| Nylon-11/PPO/ Poly(VPh-g-S) 47.5/47.5/5.0 | 28 | 4 | none | 910 | 0.6 |

EXAMPLE II

In the procedure described in Example I, the crystalline polyamide nylon MXD6 [poly(meta-xylylene adipate)] was blended with PPO and Poly(VPh-g-S). The nylon MXD6 was obtained from the Mitsubishi Gas and Chemical Corp. in pellet form. The pellets were ground in a grinder in the presence of liquid nitrogen. Thereafter, 9.5 g of MXD6 was mixed with 9.5 g of PPO and 1.0 g of poly(vinylphenol-g-styrene)("VPh-g-S") in their powdered form in a bottle. The powders were then dried overnight at ca. 110° C. under vacuum and melt mixed and extruded at a temperature of 271° C. using a laboratory extruder equipped with a ¼-inch screw and a 2" slit die. Continuous films approximately 2" wide and approximately 0.4 mm thick were obtained. The same procedure was followed to prepare a 1/1 by weight melt-extruded blend of MXD6 with PPO without added Poly (VPh-g-S). Improved physical properties were measured (listed below in TABLE II) for the blend containing the graft copolymer relative to the blend without the graft copolymer.

TABLE II

| Blend Composition | Stress at break $\sigma_b$, MPa | Strain at break $\epsilon_b$, % | Yield Stress, $\sigma_y$, MPa | Tensile Modulus, MPa | Work to break, MPa |
|---|---|---|---|---|---|
| MXD6/PPO 50/50 | 49 | 3 | 49 | 2120 | 0.7 |
| MXD6/PPO/ Poly (VPh-g-S) 47.5/47.5/5.0 | 48 | 43 | 62 | 2240 | 20 |

EXAMPLE III

Additional blends with added compatibilizer and comparisons not having the compatibilizer were prepared and tested in the manner described in Examples I and II. The ZYTEL ™ and ZYTEL-ST ™ polyamides are toughened crystalline polyamides obtained from DuPont. Results of the extruded blends are shown in Table III.

TABLE III

| Blend Composition | Property | | | | |
|---|---|---|---|---|---|
| | Stress at break $\sigma_b$, MPa | Strain at break $\epsilon_b$, % | Yield Stress, $\sigma_y$, MPa | Tensile Modulus, MPa | Work to break, MPa |
| ZYTEL/PPO 50/50 | 34 | 14 | 35 | 1020 | 4 |
| ZYTEL/PPO/Poly(VPh-g-S) 47.5/47.5/5.0 | 40 | 23 | 40 | 1200 | 8 |
| ZYTEL-ST/PPO 75/25 | 28 | 150 | 19 | 480 | 35 |
| ZYTEL-ST/PPO/Poly(VPh-g-S) 71.25/23.75/5.0 | 45 | 200 | 21 | 550 | 64 |
| ZYTEL-ST/PPO 50/50 | 43 | 120 | 31 | 870 | 45 |
| ZYTEL-ST/PPO/Poly(VPh-g-S) 47.5/47.5/5.0 | 61 | 160 | 39 | 1120 | 72 |
| ZYTEL-ST/PPO 25/75 | 59 | 110 | 44 | 1240 | 56 |
| ZYTEL-ST/PPO/Poly(VPh-g-S) 23.75/71.25/5.0 | 76 | 140 | 50 | 1500 | 80 |

The invention has been described in detail with particular reference to preferred embodiments thereof, but it will be understood that variations and modifications can be effected within the spirit and scope of the invention. All patents, patent applications (published or unpublished, domestic or foreign), scientific literature, books and other prior art cited herein are each incorporated herein by reference for the teaching therein pertinent to this invention.

That which is claimed is:

1. A blend comprising: (A) a polyamide; (B) a polymer selected from the group consisting of poly(phenylene oxide), polystyrene, high-impact polystyrene, tetramethyl-bisphenol-A polycarbonate, poly(vinyl methyl ether), and mixtures thereof; and (C) a compatibilizer comprising a copolymer having repeating units derived from an aromatic vinyl compound monomer and repeating units derived from vinylphenol monomers, wherein at least about 50% of said aromatic vinyl compound monomers are styrene monomeric units.

2. A blend according to claim 1 wherein said component (B) is selected from the group consisting of poly(phenylene oxide), polystyrene, and mixtures thereof.

3. A blend according to claim 2 wherein component (B) is poly(2,6-dimethyl-1,4-phenylene oxide).

4. A blend according to claim 1 wherein said compatibilizer is selected from the group consisting of poly(styrene-b-vinylphenol) block copolymers; poly(styrene-g-vinylphenol) graft copolymers; poly(vinylphenol-g-styrene) graft copolymers; poly(styrene-co-vinylphenol) random copolymers, and mixtures thereof.

5. A blend according to claim 4 wherein said compatibilizer is selected from the group consisting of poly(vinylphenol-g-styrene) graft copolymers and poly(styrene-b-vinylphenol) block copolymers.

6. A blend according to claim 5 wherein said copolymer composition is approximately about 50 parts of styrene monomers and 50 parts of vinylphenol monomers, based on 100 parts total of said combined styrene and vinylphenol monomers.

7. A blend according to claim 1 wherein said polyamide is selected from the group consisting of nylon 6, nylon 6,6, nylon 11, nylon 3Me6T, nylon MXD6, toughened crystalline polyamides and mixtures thereof.

8. A blend according to claim 7 wherein said polyamide is selected from the group consisting of MXD6, toughened crystalline polyamide.

9. A blend according to claim 1 wherein said compatibilizer is present in an amount within the range of about least 1 to about 10 parts by weight, based on the 100 parts of the combined components (A), (B) and (C).

10. A blend according to claim 9 wherein said compatibilizer is present in range of 2 to 7 parts by weight.

11. A blend according to claim 10 wherein said compatibilizer is present in an amount of about 5 parts by weight.

12. A blend according to claim 11 wherein said polyamide is selected from the group consisting of MXD6, toughened crystalline polyamides, said compatibilizer is selected from the group consisting of poly(vinylphenol-g-styrene) graft copolymers and poly(styrene-b-vinylphenol) block copolymers; and said component (B) is poly(2,6-dimethyl-1,4-phenylene oxide).

13. A blend comprising: (A) a polyamide; (B) a polymer selected from the group consisting of poly(phenylene oxide), polystyrene, and mixtures thereof; and (C) a compatibilizer comprising a copolymer having repeating units derived from an aromatic vinyl compounds monomer and repeating units derived from vinylphenol monomers, wherein at least about 50% of said aromatic vinyl compound monomers are styrene monomeric units.

14. A blend according to claim 13 wherein said compatibilizer is selected from the group consisting of poly(vinylphenol-g-styrene) graft copolymers and poly(styrene-b-vinylphenol) block copolymers.

15. A blend according to claim 14 wherein said component (B) is poly(2,6-dimethyl-1,4-phenylene oxide).

16. A blend according to claim 15 wherein said compatibilizer is approximately about 50 parts of styrene monomers and 50 parts of vinylphenol monomers, based on 100 parts of said combined styrene and vinylphenol monomers.

17. A blend according to claim 16 wherein said polyamide is selected from the group consisting of MXD6, and toughened crystalline polyamides.

* * * * *